United States Patent
Park

(10) Patent No.: US 10,629,208 B2
(45) Date of Patent: Apr. 21, 2020

(54) VIDEO COMMUNICATION METHOD AND ROBOT FOR IMPLEMENTING THE METHOD

(71) Applicant: LG ELECTRONICS INC., Seoul (KR)

(72) Inventor: Jihwan Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/557,310

(22) Filed: Aug. 30, 2019

(65) Prior Publication Data

US 2019/0385616 A1 Dec. 19, 2019

(30) Foreign Application Priority Data

Aug. 1, 2019 (KR) ........................ 10-2019-0093717

(51) Int. Cl.
*G10L 17/00* (2013.01)
*H04N 7/14* (2006.01)
*H04R 1/32* (2006.01)
*H04N 5/232* (2006.01)

(52) U.S. Cl.
CPC ....... *G10L 17/005* (2013.01); *H04N 5/23206* (2013.01); *H04N 5/23216* (2013.01); *H04N 7/141* (2013.01); *H04R 1/326* (2013.01)

(58) Field of Classification Search
CPC .......... G10L 17/00; H04N 7/14; H04N 5/232; H04R 1/32
USPC ............ 348/14.01–14.16; 700/259, 245, 264
See application file for complete search history.

(56) References Cited

U.S. PATENT DOCUMENTS

| | | | |
|---|---|---|---|
| 10,091,412 B1 * | 10/2018 | Feng | H04N 5/23219 |
| 10,321,065 B2 * | 6/2019 | Shi | G06T 7/20 |
| 2012/0218371 A1 * | 8/2012 | Cutler | H04N 7/142 |
| | | | 348/14.01 |
| 2018/0070053 A1 * | 3/2018 | Feng | G06K 9/00718 |

\* cited by examiner

*Primary Examiner* — Melur Ramakrishnaiah
(74) *Attorney, Agent, or Firm* — KED & Associates, LLP

(57) ABSTRACT

Provided are a video communication method and a robot implementing the same. The robot includes a camera configured to acquire a first video for a video call, a multi-channel microphone configured to receive a sound signal, a memory storing one or more instructions, and a processor configured to execute the one or more instructions. The processor calculates positions at which a plurality of voice signals included in the sound signal are generated, calculates positions of N users appearing in the first video (here, N is an integer greater than or equal to 2), selects N voice signals generated at the same positions as the N users from among the plurality of voice signals, calculates a ratio of times during which a voice is detected from waveforms of the N voice signals in a previous time period prior to a first time point, and determines a main user of the video call at the first time point on the basis of the ratio of times.

20 Claims, 7 Drawing Sheets

FIG. 4
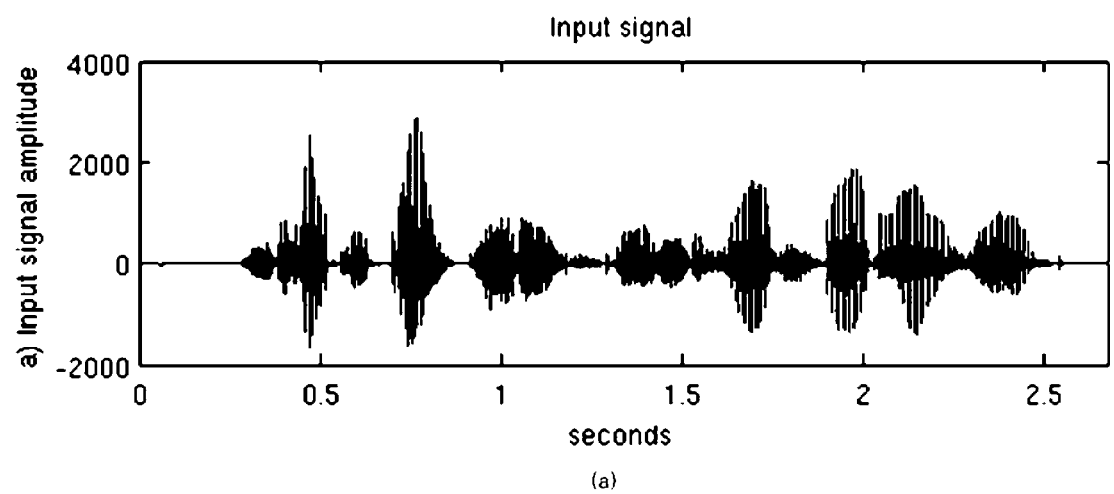
(a)
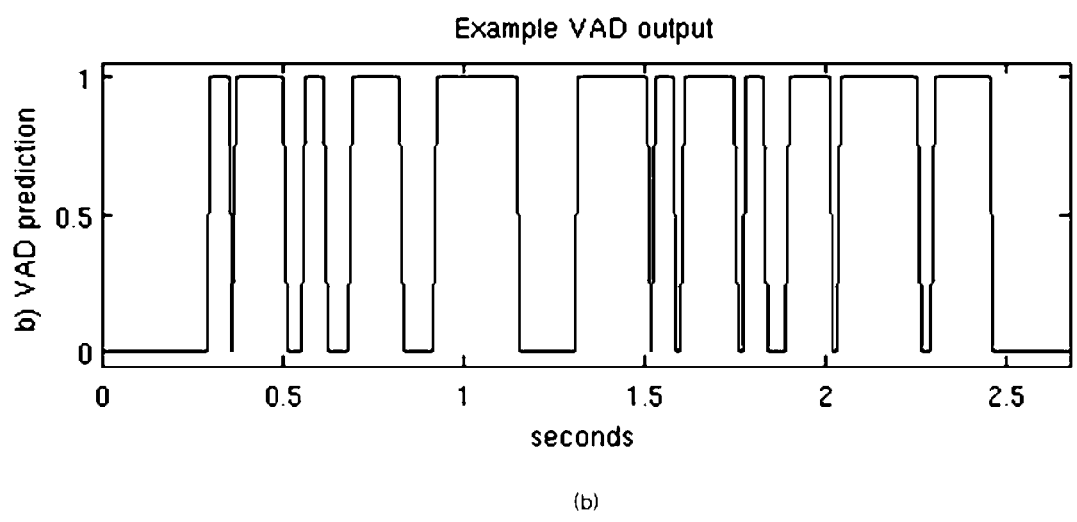
(b)

VIDEO COMMUNICATION METHOD AND ROBOT FOR IMPLEMENTING THE METHOD

CROSS-REFERENCE TO RELATED APPLICATION

This application claims priority to and the benefit of Korean Patent Application No. 10-2019-0093717 filed on Aug. 1, 2019, the disclosure of which is incorporated herein by reference in its entirety.

BACKGROUND

1. Field of the Invention

The present invention relates to a video communication method and a robot for implementing the same.

2. Discussion of Related Art

With the rapid development of communication-related technology, a video call function of enabling a caller and a called party to talk while looking at the other party's face has been activated. Through the video call function, a call is made while transmitting and receiving videos captured by cameras of a calling terminal and a called terminal.

The video call function may be performed through a robot which includes a camera, a speaker, a microphone, a communicator, and a display. The robot may transmit a first video acquired by the robot to a counterpart robot, receive a second video from the counterpart robot, display the second video on a display thereof, and make a video call using the second video.

There may be a case in which a video call is made by a plurality of users through one robot. In particular, a situation may occur in which a voice signal output from a user who does not appear on a screen of the display is transmitted to a counterpart user. In this case, the quality of the video call decreases due to the voice signal of the user who does not appear on the screen.

In addition, when there are two or more users on the screen, it is difficult to determine which user is a main speaker of the video call.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIG. 4 is a diagram illustrating a concept of a voice output section and a non-voice output section of a user's voice signal according to an embodiment of the present invention;

DETAILED DESCRIPTION OF EXEMPLARY EMBODIMENTS

Figure 1:
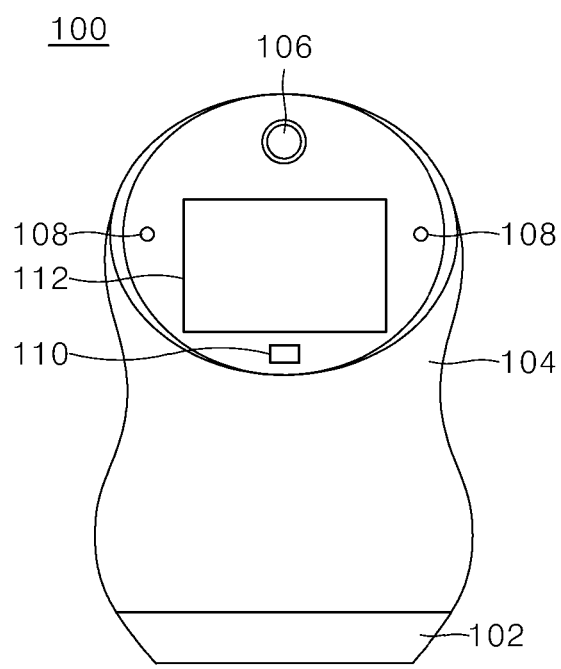
FIG. 1 is a view illustrating the appearance of a robot according to an embodiment of the present invention.

Hereinafter, embodiments of the present invention will be described in detail with reference to the accompanying drawings so that those of ordinary skill in the art can easily implement the embodiments. The present invention may be embodied in many different forms and is not limited to the embodiments set forth herein.

For clarity, parts not related to explaining the present invention are omitted herein, and the same reference numerals are assigned to the same or like components throughout the specification. Some embodiments of the present invention will be described below in detail with reference to exemplary drawings. In the drawings, the same reference numerals are used to denote the same elements throughout the drawings even when the elements are shown in different drawings. In the following description, well-known functions or constructions are not described in detail when it is determined that they would obscure the invention due to unnecessary detail.

In describing components of the present invention, the terms "first," "second," "A," "B," "(a)," "(b)," etc. may be used. These terms are merely used herein to distinguish each component from other components and thus the natures, sequence, order, or number of the components corresponding thereto are not limited by these terms. When an element is referred to as being "coupled to," "combined with," or "connected to" another element, it should be understood that the element may be directly coupled to, combined with, or connected to the other element or may be coupled to, combined with, or connected to the other component while another element is interposed therebetween or via another element.

For convenience of explanation, elements of the present invention may be divided into sub-elements and explained but the elements may be included in one device or module or one element may be divided into sub-elements and included in a plurality of devices or modules.

Hereinafter, the term "robot," when used herein, may refer to a machine that automatically handles a given task or operates with its own capabilities. In particular, a robot having a function of identifying an environment and determining and performing an operation with its own decision may be referred to as an intelligent robot.

Robots may be classified into industrial robots, medical robots, household robots, military robots, etc. according to a purpose or field of use.

A robot may include a driving unit having an actuator or a motor to perform various physical operations such as moving joints thereof. Because a wheel, a brake, a propeller, and the like are included in a driving unit of a movable robot, the movable robot is capable of moving on the ground or flying in the air through the driving unit.

FIG. 1 is a view illustrating the appearance of a robot according to an embodiment of the present invention.

FIG. 1 illustrates a robot 100 which is a stationary robot that does not move, but the present invention is not limited thereto and the following description may also apply to mobile robots.

Referring to FIG. 1, the robot 100 includes a first body part 102 which is a lower part, and a second body part 104 above the first body part 102.

Here, the first body part 102 is fixed. The second body part 104 is rotatable on the first body part 102 to the left or right and may be angle-adjustable (i.e., tiltable) in a vertical direction.

A camera 106 is attached to an upper surface of the second body part 104. Thus, the camera 106 is rotated and tilted together with the rotation and tilting of the second body part 104. A focal length of the camera 106 is adjustable and thus an image zoom function is usable.

A microphone 108, a speaker 110, and a display 112 are also attached to the second body part 104. A sensor unit may be attached to an outer side of the second body part 104, and a communicator, a memory, and a processor may be provided inside the second body part 104.

Figure 2:
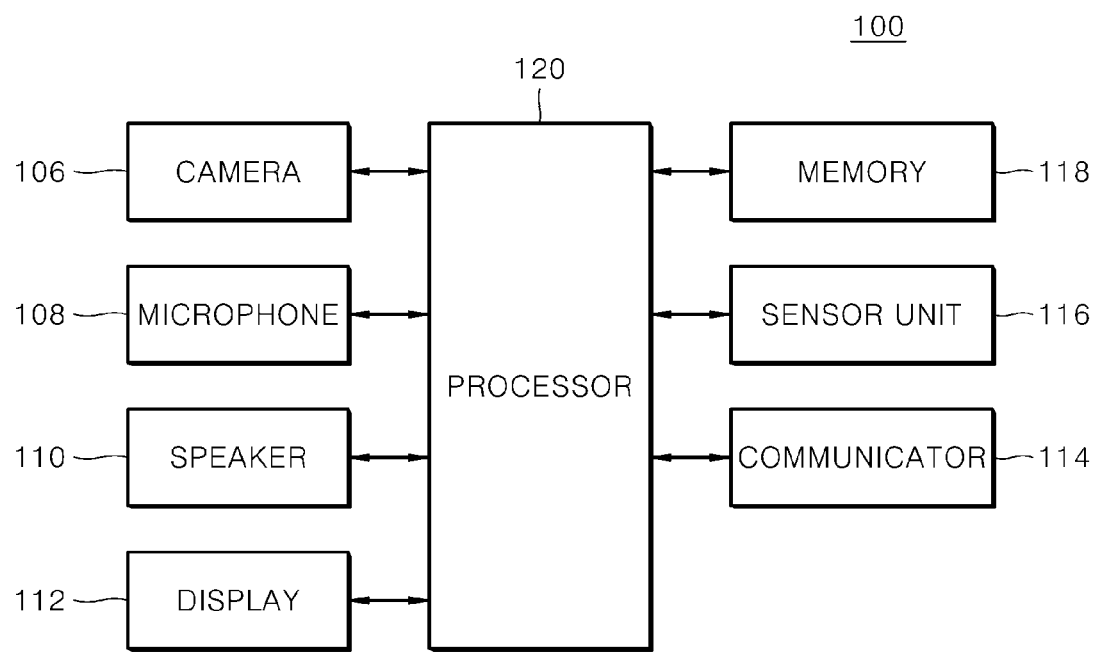
FIG. 2 is a block diagram illustrating a control relationship between main components of a robot according to an embodiment of the present invention.

FIG. 2 is a block diagram illustrating a control relationship between main components of a robot 100 according to an embodiment of the present invention.

Referring to FIG. 2, the robot 100 according to an embodiment of the present invention is an electronic device applicable to performing a video call and includes a camera 106, a microphone 108, a speaker 110, a display 112, a communicator 114, a sensor unit 116, a memory 118, and a processor 120 as described above.

Functions of these component will be described in detail below.

The camera 106 may acquire a video of a space. Here, the space may be an indoor space or an outdoor space. As described above, as the second body part 104 rotates and tilts, the camera 106 may be rotated and tilted to the left or right, and the focal length of the camera 106 may be adjusted.

The microphone 108 receives a voice signal output from the space. As described above, the microphone 108 may be a multi-channel microphone.

The speaker 110 may be used during a video call and may output to a sound source signal included in a video transmitted by a counterpart robot or terminal in the video call (hereinafter referred to as the "counterpart robot" for convenience of description) to the space.

The display 112 may include a liquid crystal display (LCD), a light-emitting diode (LED) display, an organic LED (OLED) display, or the like, and is a device capable of displaying an image or an image frame to a user. In particular, the display 112 may be a touch display with a touch device.

The communicator 114 establishes communication with the counterpart terminal. That is, the communicator 114 transmits a video created by the robot 100 to the counterpart terminal and receives a video transmitted from the counterpart terminal.

In this case, the communicator 114 may include a mobile communication module, a short-range communication module, and the like.

The mobile communication module may transmit a radio signal to or receive a radio signal from at least one of a base station, an external terminal device, or a communication server in a mobile communication network established according to mobile communication technology standards or a communication method, e.g., the Global System for Mobile communication (GSM), Code Division Multi-Access (CDMA), CDMA2000, Enhanced Voice-Data Optimized or Enhanced Voice-Data Only (EV-DO), Wideband CDMA (WCDMA), High-Speed Downlink Packet Access (HSDPA), High-Speed Uplink Packet Access (HSUPA), Long-Term Evolution (LTE), LTE-Advanced (LTE-A), or the like.

The short-range communication module is for short-range communication and includes at least one of Bluetooth, Radio Frequency IDentification (RFID), Infrared Data Association (IrDA), Ultra Wideband (UWB), ZigBee, Near-Field Communication (NFC), Wi-Fi, Wi-Fi Direct, or Wireless Universal Serial Bus (USB) technology.

The sensor unit 116 may include at least one sensor and sense specific information regarding an external environment of the robot 100. As an example, the sensor unit 116 may include a light detection and ranging (LiDAR) sensor, a radar sensor, an infrared sensor, an ultrasonic sensor, a radio-frequency (RF) sensor, and the like to measure a distance to an object (a user, etc.) located near the robot 100 and may further include various other sensors such as a geomagnetic sensor, an inertial sensor, a photo sensor, and the like.

The memory 118 may include a volatile memory and/or a nonvolatile memory and stores instructions or data related to at least another component of the terminal device 100. In particular, the memory 118 may store instructions or data related to a computer program or a recording medium for making a video call.

The processor 120 may include one or more among a central processing unit, an application processor, and a communications processor. The processor 120 may execute operations or data processing related to control and/or communication of at least another component of the robot 100 and execute instructions related to the execution of the computer program.

A video communication method using the robot 100 according to an embodiment will be described in more detail with reference to FIG. 3 below.

Figure 3:
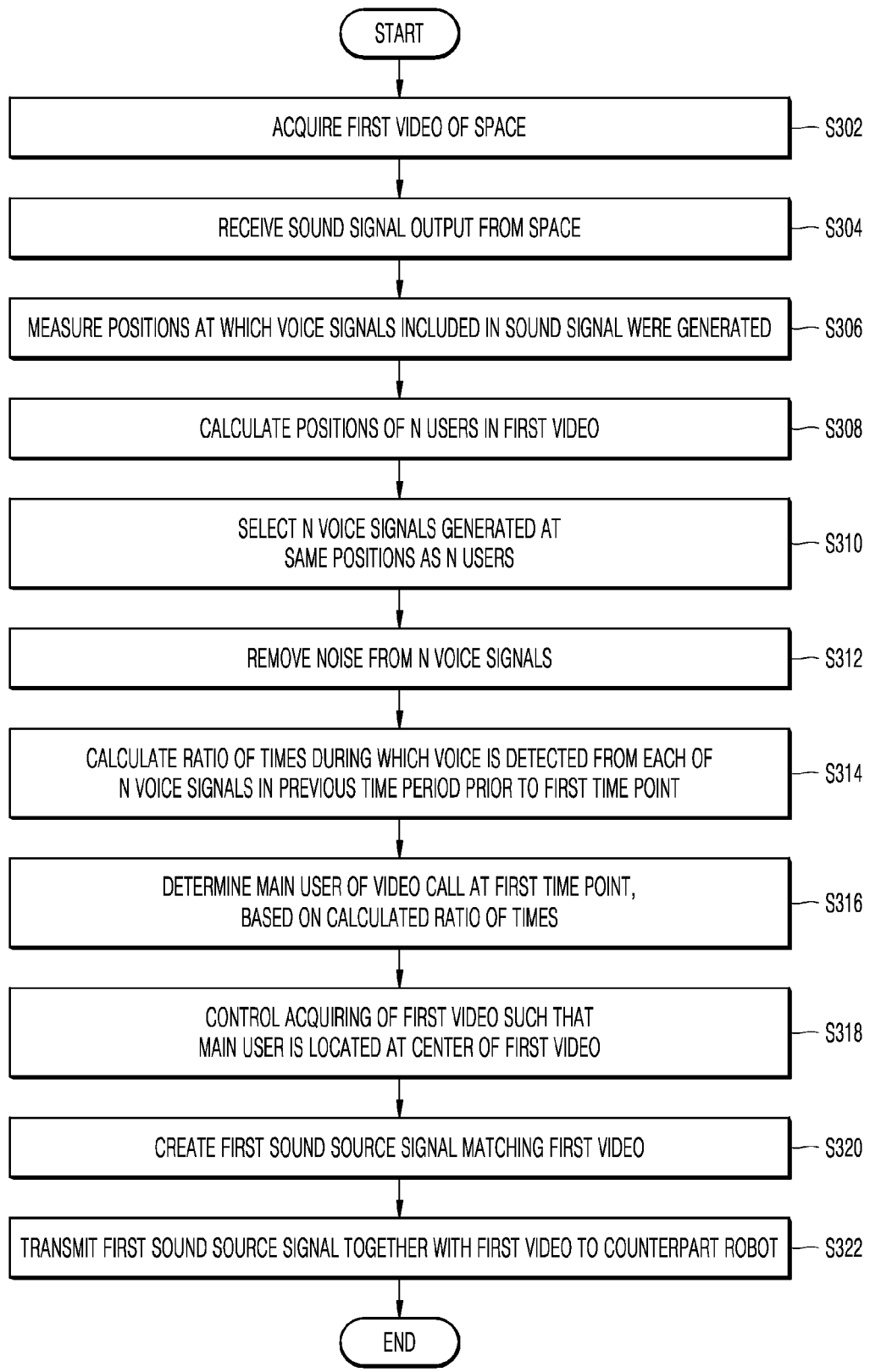
FIG. 3 is a flowchart of a video communication method using a robot according to a first embodiment of the present invention.

FIG. 3 is a flowchart of a video communication method using the robot 100 according to a first embodiment of the present invention.

It is assumed that at the start of a video call, a face of the robot 100 faces one of the plurality of users located in a space. In this case, the one user may be closest to the robot 100.

It is also assumed that when the video call is started, the robot 100 receives a second video, which is a video of the other party, from a counterpart terminal (robot), displays the second video on the display 112, and receives a sound source signal included in the second video.

Operations of the video communication method will be described in detail below.

In operation S302, the camera 106 acquires a video of a space for making a video call. The video acquired by the robot 100 will be hereinafter referred to as a first video.

The camera 106 may rotate to the left or right or tilt upward or downward and thus the first video may be captured in all directions of the space.

In operation S304, the microphone 108 receives a sound signal output from the space.

In this case, the sound signal may include a plurality of voice signals output from the plurality of users located in the space.

In operation S306, the processor 120 measures positions at which the plurality of voice signals included in the sound signal were generated. In this case, the positions of generation of the plurality of voice signals may be angles at which the plurality of voice signals were generated relative to a position of the robot 100.

As an example, the processor 120 may calculate positions (angles) of generation of the plurality of voice signals by applying a sound source localization (SSL) algorithm to a sound signal received via a multi-channel microphone.

In operation S308, the processor 120 calculates positions of N users in the acquired first video (here, N is an integer greater than or equal to 2). That is, the processor 120 calculates the positions of the N users by analyzing the first video and using information sensed by the sensor unit 116.

In this case, the N users in the first video are users who are within an angle of view of the camera 106 when a video is captured by the camera 106 in a specific direction, i.e., users in the first video.

In operation S310, the processor 120 selects N voice signals generated at the same positions as the N users in the first video from among a plurality of voice signals. That is, the processor 120 selects N voice signals generated within the angle of view of the camera 106 from among the plurality of voice signals. The N voice signals are voice signals output from the N users.

In operation S312, the processor 120 removes noise from the N voice signals. Various noise cancellation techniques are applicable to operation S312.

In operation S314, the processor 120 calculates a ratio of times during which a voice is detected from a waveform of each of the N voice signals in a previous time period prior to a first time point.

In this case, the first time point may be a current time point. The previous time period may be a specific time period prior to the first time point. For example, the previous time period may be 2 or 3 seconds. The ratio of the times during which the voice is detected refers to a total time during which a user spoke in the previous time period.

In an embodiment of the present invention, the waveform of each of the N voice signals in the previous time period may include at least one voice output section and at least one non-voice output section, and the processor 120 may calculate a ratio of a total time of at least one voice output section to the total time of the previous time period. In this case, the calculated ratio corresponds to a ratio of times during which the voice is detected from the waveforms.

Operation S314 will be described in more detail with reference to the following drawings.

FIG. 4 is a diagram illustrating the concept of a voice output section and a non-voice output section of a user's voice signal according to an embodiment of the present invention.

More specifically, FIG. 4A shows an example of a waveform in a time domain of a certain user's voice signal.

Referring to FIG. 4A, the waveform in the time domain of the user's voice signal includes at least one section of strong signal intensity and at least one section of weak signal intensity. In this case, the section of strong signal intensity is a section in which the user spoke, i.e., a voice output section, and the section of weak signal intensity is a section in which the user did not speak, i.e., a non-voice output section.

The processor 120 may use a predetermined threshold intensity to distinguish between the voice output section and the non-voice output section. That is, the processor 120 determines whether the intensity of the voice signal is greater than or equal to the predetermined threshold intensity at a time point in a total period of the waveform on the basis of the waveform of the user's voice signal. In this case, the threshold intensity may be determined experimentally, and may be, for example, very low signal intensity.

Accordingly, the processor 120 may determine a section in which the intensity of the voice signal is greater than or equal to the threshold intensity as the voice output section, and a section in which the intensity of the voice signal is less than the threshold intensity as the non-voice output section.

FIG. 4B is a graph including a voice output section/non-voice output section based on a waveform of a voice signal.

Here, the X-axis of the graph is the same as the X-axis of the waveform, and the Y-axis of the graph has a value of 0 or 1. A section with the Y-axis of 0 corresponds to the non-voice output section, and a section with the Y-axis of 1 corresponds to the voice output section. Thus, the processor 120 may calculate a total time of at least one voice output section using the graph and calculate a ratio of times during which a voice is detected from the waveform of the voice signal on the basis of the calculated total time.

Referring back to FIG. 3, in operation S316, the processor 120 determines a main user of the video call at the first time point on the basis of the calculated ratio of times. That is, in operation S316, the main user who is a main speaker of the video call among the N users within the angle of view of the camera 106 is determined.

In an embodiment of the present invention, the processor 120 may set a first user corresponding to a maximum ratio of times among calculated ratios of times of the N users' voice signals as a main user (a main speaker) of the video call.

That is, the processor 120 may set a user who spoke most frequently, i.e., a user who spoke actively, in the previous time period prior to the first time point as the first user. In other words, a user who spoke most frequently in the previous time period is a user who led a conversation with the other party and thus may be determined as a main user.

A case in which there are two or more first users who spoke most frequently in the previous time period may occur. In this case, the robot 100 cannot determine a main user.

In order to prevent the above case, according to an embodiment of the present invention, the processor 120 may determine a first user located a minimum distance from the robot 100 as a main user.

That is, a person closest to the robot 100 is likely to be a person who is most interested in the video call. Thus, the processor 120 may determine, as a main user, a first user located the minimum distance from the robot 100 among the two or more first users.

In this case, when the sensor unit 116 is not provided or does not operate, the processor 120 may determine the first user located the minimum distance from the robot 100 by analyzing the first video. That is, the processor 120 may estimate as a main user a first user whose face looks biggest in the first video from among the two or more first users.

More specifically, a person whose face looks biggest in the video is estimated to be a person closest to the robot 100 due to perspective. Therefore, the processor 120 may identify the first users' faces, calculate the sizes of the identified first users' faces by calculating the diagonal lengths thereof, normalize the sizes of the first users' faces according to the distances between pupils, and determine a first user having a maximum face size among the normalized first users' faces as a main user.

Next, in operation S318, the processor 120 controls the acquiring of the first video of the camera 106 such that the main user is located at the center of the first video.

In operation S320, the processor 120 creates a first sound source signal matching the first video. That is, the first sound source signal is a sound source signal output to the counterpart robot together with the first video. In operation S322, the communicator 114 transmits the first sound source signal together with the first video to the counterpart robot under control of the processor 120. In this case, the processor 120 may create the first sound source signal to include the N voice signals, excluding the remaining voice signals except the N voice signals among the plurality of voice signals.

That is, in order to improve the quality of the video call, it is preferable to remove a voice signal of a user who does not appear in the first video, i.e., a voice signal of a user who is not located within the angle of view of the camera 106. Accordingly, the processor 120 may calculate positions at which the plurality of voice signals included in the sound signal were generated, divide the plurality of voice signals into N voice signals within the angle of view of the camera 106 and remaining voice signals beyond the angle of view of the camera 106, and create the first sound source signal to include only the N voice signals.

To sum up, according to the present invention, the quality of the video call may be improved by determining the main user of the video call and removing voice signals not present in the first video on the basis of the above description.

Figure 5:
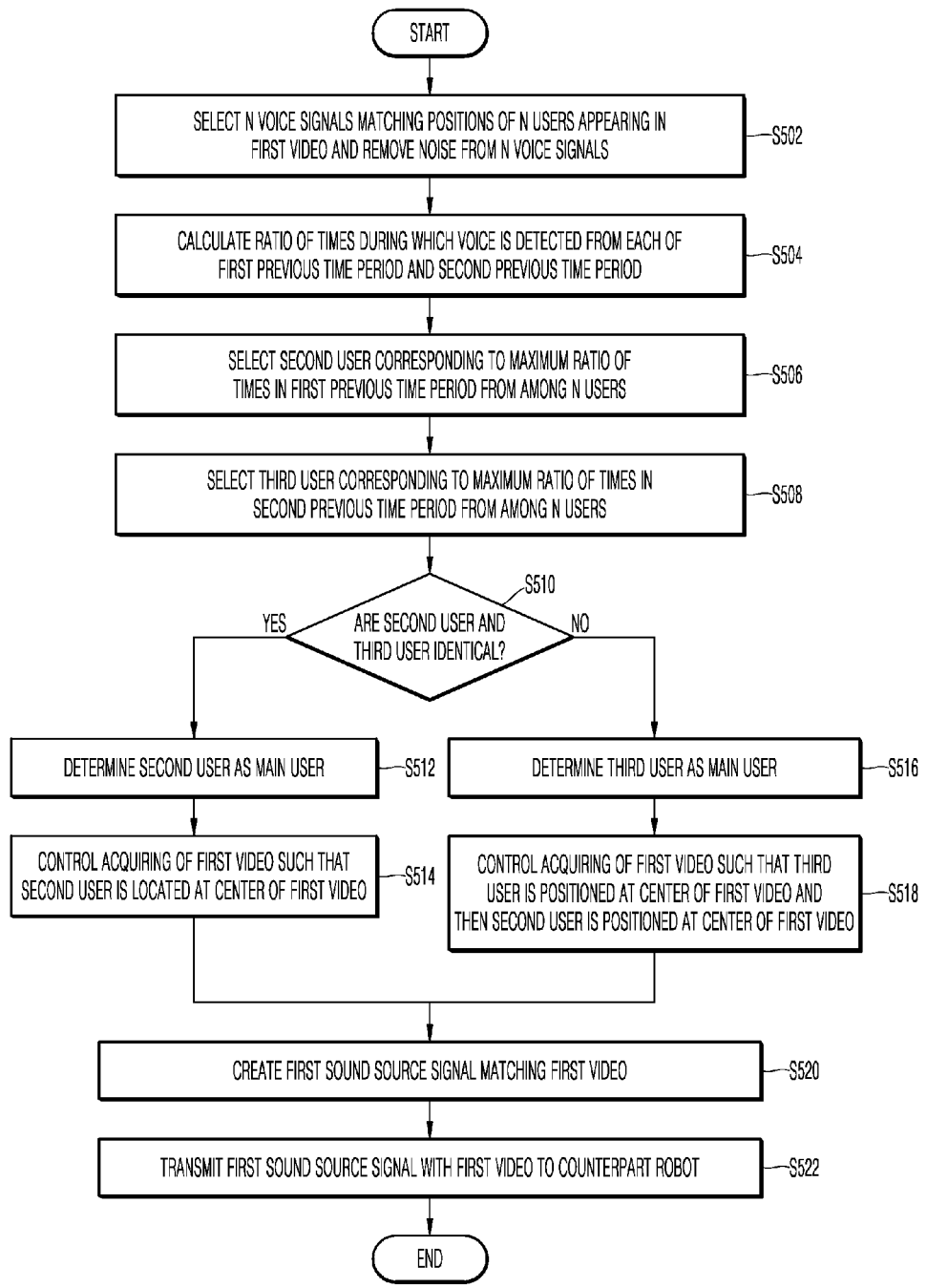
FIG. 5 is a flowchart of a video call method using a robot according to a second embodiment of the present invention.

FIG. 5 is a flowchart of a video communication method using a robot 100 according to a second embodiment of the present invention.

Operations of the video communication method will be described in detail below.

First, in operation S502, N voice signals matching positions of N users appearing in a first video are selected, and noise is removed from the N voice signals. Operation S502 is the same as operations S302 to S312 of FIG. 3 described above and thus a detailed description thereof will be omitted here.

In operation S504, the processor 120 calculates a ratio of times during which a voice is detected from a waveform of each of N voice signals in a first previous time period prior to a first time point, and a ratio of times during which the voice is detected from a waveform of each of N voice signals in a second previous time period prior to the first time point. Operation S504 may be substantially the same as operation S314 of FIG. 3 described above.

Here, the first previous time period and the second previous time period are previous specific time periods prior to the first time point, and the first previous time period is longer than the second previous time period. The first previous time period is a previous time period used to determine a user who spoke actively in a relatively long time period, and the second previous time period is used to determine a user who spoke actively in a relatively short time period.

Figure 6:
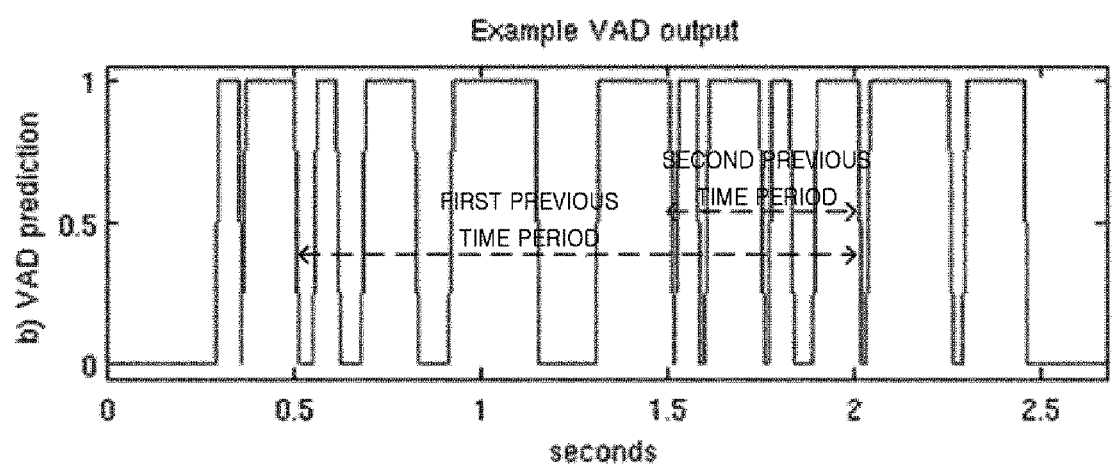
FIG. 6 is a view for explaining the concept of previous time periods according to an embodiment of the present invention.

FIG. 6 illustrates the concept of a first previous time period and a second previous time period. When a first time point is a time point of "2 seconds" on the X-axis, a first previous time period may be a section having a duration of 1.5 seconds from the first time point, and a second previous time period may be a section having a duration of 0.5 seconds from the first time point.

Referring back to FIG. 5, in operation S506, the processor 120 selects a second user corresponding to a maximum ratio of times in the first previous time period from among N users on the basis of the calculated ratio of times in the first previous time period. In operation S508, the processor 120 selects a third user corresponding to a maximum ratio of times in the second previous time period from among the N users on the basis of the calculated ratio of times in the second previous time period.

Thereafter, in operation S510, the processor 120 determines whether the second user and the third user are identical.

When the second user and the third user are identical, in operation S512, the processor 120 determines the second user as a main user. Next, in operation S514, the processor 120 controls the acquiring of the first video of the camera 106 such that the second user is located at the center of the first video.

That is, a situation in which the second user and the third user are the same refers to a situation in which one user spoke actively both in a long time period and a short time period. Therefore, the camera 106 may capture the first video such that the second user is positioned at the center of the angle of view.

Conversely, when the second user and the third user are not identical, in operation S516, the processor 120 determines the third user as a main user. In this case, in operation S518, the processor 120 controls the acquiring of the first video of the camera 106 such that the third user is positioned at the center of the first video for a predetermined time and then the second user is positioned at the center of the first video.

That is, a situation in which the second user and the third user are not identical is a situation in which the second user spoke actively in a long time period but the third user suddenly spoke a lot at a more recent time point than the first time point. Accordingly, the camera 106 may acquire the first video such that the third user is located at the center of the first video for a short time and thereafter the second user is located at the center of the first video.

When there are two or more second users, in operation S518, a second user whose face looks biggest in the first video or a second user located a minimum distance from the robot 100 may be selected. When there are two or more third users, in operation S510, a third user whose face looks biggest in the first video or a third user located a minimum distance from the robot 100 may be selected. When one of two or more third users is identical to the second user, in operation S512, it is determined that the second user and the third user are identical.

In operation S520, the processor 120 creates a first sound source signal matching the first video. In operation S522, the communicator 114 transmits the first sound source signal along with the first video to the counterpart robot under control of the processor 120.

Figure 7:
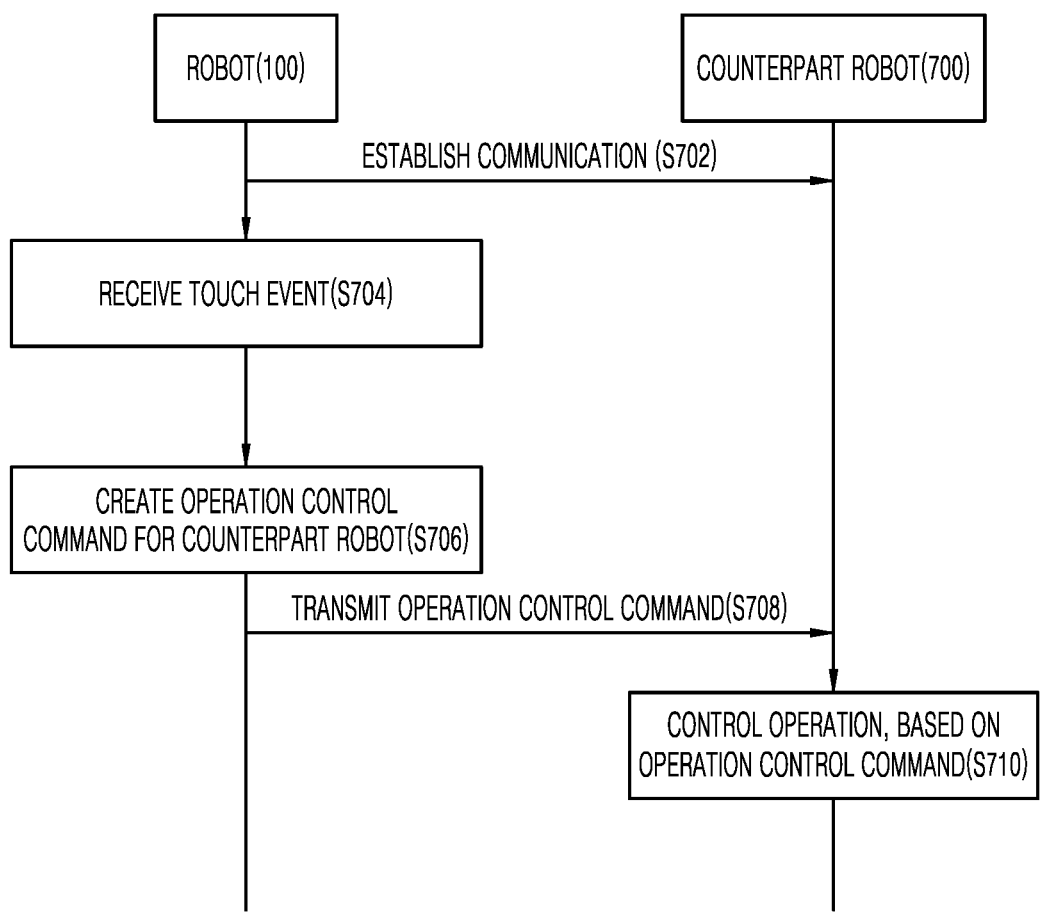
FIG. 7 is a flowchart of a video communication method performed between a robot and a counterpart robot according to a third embodiment of the present invention.

FIG. 7 is a flowchart of a video communication method performed between a robot 100 and a counterpart robot 700 according to a third embodiment of the present invention.

In operation S702, communication is established between the robot 100 and the counterpart robot 700. Thus, the robot 100 may transmit a video to or receive a video from the counterpart robot 700 in real time.

In operation S704, the robot 100 receives a specific touch event from the user.

As an example, the touch event may be swiping a touch display by a user in one of up, down, left, and right directions. As another example, the touch event may be increasing or decreasing the distance between the user's two fingers touching the touch display.

In operation S706, the robot 100 creates an operation control command for the counterpart robot 700 on the basis of the received touch event.

As an example, when the touch event is a swiping motion, the operation control command may be a command to adjust an angle of the counterpart robot 700 in a direction in which swiping is performed.

As another example, when the touch event is increasing the distance between fingers, the operation control command may be a command to control a focal length for a zoom-in operation of a camera included in the counterpart robot 700.

As another example, when the touch event is decreasing the distance between fingers, the operation control command may be a command to control a focal length for a zoom-out operation of the camera included in the counterpart robot 700.

In operation S708, the robot 100 transmits the operation control command to the counterpart robot 700. In operation S710, an operation of the counterpart robot 700 may be controlled on the basis of the motion control command.

That is, according to the present invention, a user may experience the fun of a video call through interactions between robots.

When the operation of the counterpart robot 700 is controlled on the basis of the operation control command, a case in which M users among N users within an angle of view of the camera of the counterpart robot 700 are moving beyond the angle of view, i.e., the M users are disappearing in a video, may occur (here, M is an integer greater than or equal to 1).

In this case, a processor of the counterpart robot 700 may create a second sound source signal by reducing the intensity of M voice signals output from the M users and transmit the second sound source signal to the robot 100. That is, in order to deliver an effect of disappearance to a counterpart user, the counterpart robot 700 may reduce the intensity of the disappearing users' voice.

According to an embodiment of the present invention, the processor of the counterpart robot 700 may reduce the intensity of the M voice signals by using the differences in angles between a center axis of the camera and the positions of the M users. For example, the differences in angle between the center axis of the camera and a disappearing user may be inversely proportional to the intensitys of the signals to be reduced.

The intensity of the reduced voice signals may be lower than that of a lowest voice signal of a user appearing in the video. Accordingly, the effect of disappearance can be clearly transmitted to the counterpart user.

According to the present invention, even when a video call is conducted by a plurality of users, the quality of the video call can be improved.

The effects of the present invention are not limited to the above effects, and various other effects of the present invention may be easily derived from the configuration of the present invention by those of ordinary skill in the art.

Although it is described that all components of an embodiment of the present invention are combined with each other or are operated while being combined with each other, the present invention is not necessarily limited thereto, and at least one of all the components may be operated while being selectively combined with each other without departing from the scope of the present invention. Although each of all the components may be embodied as independent hardware, some or all of the components may be selectively combined to realize a computer program having a program module which performs some or all of functions of a combination of one or more hardware units. Code and code segments constituting the computer program can be easily reasoned by those of ordinary skill in the art. The computer program may be stored in a computer-readable medium, and an embodiment of the present invention may be implemented by reading and executing the computer program. Examples of the computer-readable medium storing the computer program include a magnetic recording medium, an optical recording medium, and a storage medium with a semiconductor recording element. The computer program for implementing the present invention includes a program module transmitted in real time via an external device.

While embodiments of the present invention have been particularly described, various changes or modifications may be made therein by general technical experts. It is therefore to be understood that such changes and modifications are included within the scope of the present invention unless they depart from the scope of the present invention.

The present invention is directed to providing a video communication method of increasing the quality of a video call when the video call is made by a plurality of users, and a robot for implementing the same.

Aspects of the present invention are not limited thereto, and other aspects and advantages of the present invention which are not mentioned herein will be apparent from the following description and will be more clearly understood by embodiments of the present invention. It will also be readily understood that aspects and advantages of the invention can be implemented by means defined in the appended claims and a combination thereof.

According to an aspect of the present invention, a robot includes a camera configured to acquire a first video for a video call; a multi-channel microphone configured to receive a sound signal; a memory storing one or more instructions; and a processor configured to execute the one or more instructions. The processor calculates positions at which a plurality of voice signals included in the sound signal are generated, calculates positions of N users appearing in the first video (here, N is an integer greater than or equal to 2), selects N voice signals generated at the same positions as the N users from among the plurality of voice signals, calculates a ratio of times during which a voice is detected from waveforms of the N voice signals in a previous time period prior to a first time point, and determines a main user of the video call at the first time point on the basis of the ratio of times.

According to another aspect of the present invention, a video communication method, performed by a robot, includes acquiring a first video for a video call by a camera; receiving a sound signal by a multi-channel microphone; calculating, by a processor, positions at which a plurality of voice signals included in the sound signal are generated and positions of N users appearing in the first video (here, N is an integer greater than or equal to 2); selecting, by the processor, N voice signals generated at the same positions as the N users from among the plurality of voice signals; calculating, by the processor, a ratio of times during which a voice is detected from a waveform of each of the N voice signals in a previous time period prior to a first time point; and determining, by the processor, a main user of the video call at the first time point on the basis of the ratio of times.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A robot comprising:
    a camera configured to acquire a first video for a video call;
    a multi-channel microphone configured to receive a sound signal having a plurality of voice signals;
    a memory storing one or more instructions; and
    a processor configured to execute the one or more instructions to perform operations for:
        determining positions from which the plurality of voice signals are provided,
        determining positions of N users appearing in the first video, wherein N is an integer greater than or equal to 2,
        selecting, from the plurality of voice signals, N voice signals provided from the same positions as the N users,
        determining a ratio of times during which a voice is detected from a waveforms of each of the N voice signals in a previous time period prior to a first time point, and
        determining a main user of the video call at the first time point based on the determined ratio of times.

2. The robot of claim 1, wherein each of the waveforms of the N voice signals in the previous time period includes at least one voice output section and at least one non-voice output section,
    wherein the voice output section is a section within the waveform where an intensity of the respective voice signal is greater than or equal to a predetermined threshold intensity,
    the non-voice output section is a section within the waveform where the intensity of the respective voice signal is less than the predetermined threshold intensity, and
    the ratio of times for the respective voice signal is a ratio of a total time of the at least one voice output section to a total time of the previous time period.

3. The robot of claim 1, wherein the processor determines, from among the N users, the main user is a first user corresponding to a maximum ratio of times in the previous time period.

4. The robot of claim 3, wherein, when two or more first users are determined as the main user, the processor determines, from the first video, the main user as the first user whose face in the first video appears to be larger, or the processor determines, from the first video, the main user as the first user who is located a minimum distance from the robot.

5. The robot of claim 1, wherein the camera is movable, and
    the processor controls video acquiring of the camera such that an image of a first user is provided at a center of frames of the first video.

6. The robot of claim 1, wherein the previous time period includes a first previous time period and a second previous time period,
    wherein the first previous time period is longer than the second previous time period.

7. The robot of claim 6, wherein the processor selects, from among the N users, a second user corresponding to a maximum ratio of times in the first previous time period and a third user corresponding to a maximum ratio of times in the second previous time period,
   wherein when the second user and the third user are determined to be the same user, the processor determines that the second user is the main user, and
   when the second user and the third user are determined to not be the same user, the processor determines that the third user is the main user.

8. The robot of claim 7, wherein the camera is movable, and
   when the second user is determined to be the main user, the processor controls video acquiring of the camera such that an image of the second user is provided at a center of frames of the first video, and
   when the third user is determined to be the main user, the processor controls the video acquiring of the camera such that an image of the third user is provided at the center of frames of the first video for a predetermined time and subsequently the image of the second user is provided at the center of frames of the first video.

9. The robot of claim 1, further comprising:
   a communication unit configured to receive a second video for the video call, the second video being transmitted from a counterpart robot; and
   a touch display to display the second video,
   wherein the processor generates an operation control command for the counterpart robot based on a touch event input to the touch display by a user and controls the communication unit to transmit the operation control command to the counterpart robot, and
   an operation of the counterpart robot is controlled by the operation control command.

10. The robot of claim 9, wherein the touch event includes an operation in which the user swipes the touch display in one of up, down, left, and right directions, and
    the operation control command includes a command to adjust an angle of the counterpart robot in the corresponding direction.

11. The robot of claim 9, wherein the touch event includes an operation in which the user increases distance between two fingers of the user touching the touch display, and
    the operation control command includes a command to control a focal length for a zoom-in operation of a camera of the counterpart robot.

12. The robot of claim 9, wherein the touch event includes an operation in which the user decreases a distance between two fingers of the user touching the touch display, and
    the operation control command includes a command to control a focal length for a zoom-out operation of a camera of the counterpart robot.

13. The robot of claim 1, further comprising
    a communication unit configured to communicate with a counterpart robot, and
    wherein the processor is to generate a first sound source signal corresponding to the first video by using the sound signal and is to control the communication unit to transmit, to the counterpart robot, the first sound source signal along with the first video,
    wherein the first sound source signal comprises the N voice signals in the first sound source signal, and the first sound source signal does not include the voice signals, other than the N voice signals, from among the plurality of voice signals.

14. The robot of claim 1, further comprising
    a communication unit configured to communicate with a counterpart robot,
    wherein the processor is to generate a second sound source signal corresponding to the first video by using the second sound signal and is to control the communication unit to transmit, to the counterpart robot, the second sound source signal along with the first video, and
    when at least one user of the N users is removed from the first video based on an operation control command for the robot received through the communication unit, the processor is to reduce intensity of at least one voice signal corresponding to the at least one user, to generate the second sound source signal that includes the at least one voice signal having the reduced intensity, and to control the communication unit to transmit, to the counterpart robot, the second sound source signal along with the first video.

15. The robot of claim 14, wherein the processor is to reduce the intensity of the at least one voice signal based on a difference in angle between a central axis of the camera and a position of the at least one user,
    wherein the reduced intensity of the at least one voice signal is less than a minimum value of intensity of the voice signals of the users appearing in the first video.

16. A video communication method of a robot, the method comprising:
    acquiring, by a camera, a first video for a video call;
    receiving, by a multi-channel microphone, a sound signal having a plurality of voice signals;
    determining, by a processor, positions from which the plurality of voice signals are provided, and positions of N users appearing in the first video, wherein N is an integer greater than or equal to 2;
    selecting, by the processor and from the plurality of voice signals, N voice signals provided from the same positions as the N users;
    determining, by the processor, a ratio of times during which a voice is detected from a waveform of each of the N voice signals in a previous time period prior to a first time point; and
    determining, by the processor, a main user of the video call at the first time point based on the determined ratio of times.

17. The method of claim 16, wherein each of the waveforms of the N voice signals in the previous time period includes at least one voice output section and at least one non-voice output section,
    wherein the voice output section is a section within the waveform where an intensity of the respective voice signal is greater than or equal to a predetermined threshold intensity,
    the non-voice output section is a section within the waveform where the intensity of the respective voice signal is less than the predetermined threshold intensity, and
    the ratio of times for the respective voice signal is a ratio of a total time of the at least one voice output section to a total time of the previous time period.

18. The method of claim 16, wherein determining the main user includes determining, from among the N users, that the main user is a first user corresponding to a maximum ratio of times in the previous time period.

19. The method of claim 16, comprising controlling video acquiring of the camera such that an image of a first user is provided at a center of frames of the first video.

20. The method of claim 16, wherein the previous time period includes a first previous time period and a second previous time period,
  wherein the first previous time period is longer than the second previous time period,
  the method comprising:
    selecting, from among the N users, a second user corresponding to a maximum ratio of times in the first previous time period and a third user corresponding to a maximum ratio of times in the second previous time period,
    wherein when the second user and the third user are determined to be the same user, determining that the second user is the main user, and
    when the second user and the third user are determined to not be the same user, determining that the third user is the main user.

* * * * *